(12) United States Patent
Le et al.

(10) Patent No.: US 9,070,276 B2
(45) Date of Patent: Jun. 30, 2015

(54) METHOD AND APPARATUS FOR DETECTING A LEFT-BEHIND PHONE

(75) Inventors: Jialiang Le, Canton, MI (US);
Manoharprasad K. Rao, Novi, MI (US); Kwaku O. Prakah-Asante, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 231 days.

(21) Appl. No.: 13/540,983

(22) Filed: Jul. 3, 2012

(65) Prior Publication Data
US 2014/0011482 A1 Jan. 9, 2014

(51) Int. Cl.
*H04Q 7/10* (2006.01)
*G08B 21/24* (2006.01)
*G08B 19/00* (2006.01)
*H04W 4/04* (2009.01)
*H04W 4/02* (2009.01)

(52) U.S. Cl.
CPC ............ *G08B 21/24* (2013.01); *G08B 19/00* (2013.01); *H04W 4/046* (2013.01); *H04W 4/027* (2013.01)

(58) Field of Classification Search
CPC ...... H04W 4/008; H04W 4/023; H04W 4/027
USPC ............ 455/414, 410, 414.1, 418, 420, 41.2, 455/41.3, 434, 569.2, 575.8, 517; 340/463, 340/457, 686.6, 539.13
See application file for complete search history.

(56) References Cited

U.S. PATENT DOCUMENTS

| | | | |
|---|---|---|---|
| 5,600,302 A | 2/1997 | Lewis | |
| 2009/0079557 A1 | 3/2009 | Miner | |
| 2009/0146813 A1 | 6/2009 | Nuno | |
| 2011/0106375 A1* | 5/2011 | Gurusamy Sundaram | 701/33 |
| 2013/0154819 A1* | 6/2013 | Stefanovski et al. | 340/457 |
| 2013/0257604 A1* | 10/2013 | Mirle et al. | 340/425.5 |
| 2013/0271275 A1* | 10/2013 | Schalk | 340/438 |
| 2013/0278415 A1* | 10/2013 | Morgan, Jr. | 340/539.13 |
| 2014/0055276 A1* | 2/2014 | Logan et al. | 340/686.6 |

* cited by examiner

*Primary Examiner* — Patrick Edouard
*Assistant Examiner* — Julio Perez
(74) *Attorney, Agent, or Firm* — Jennifer M. Stec; Brooks Kushman P.C.

(57) ABSTRACT

A system includes a vehicle computing processor. The processor is configured to, through wireless communication with a phone, and after determining that a vehicle engine is not running, request and receive motion sensor data from the phone. The processor is further configured to determine if a phone is moving with a driver based on the motion sensor data. Also, the processor is configured to alert the driver if the phone is not moving with the driver.

10 Claims, 4 Drawing Sheets

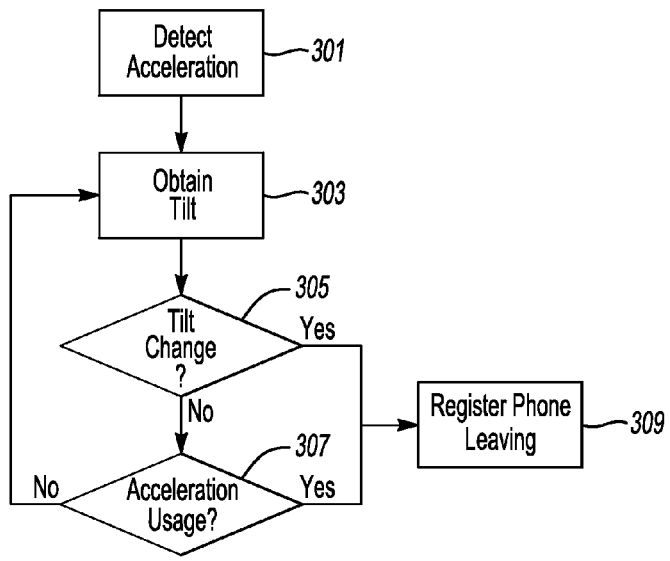
Fig-3
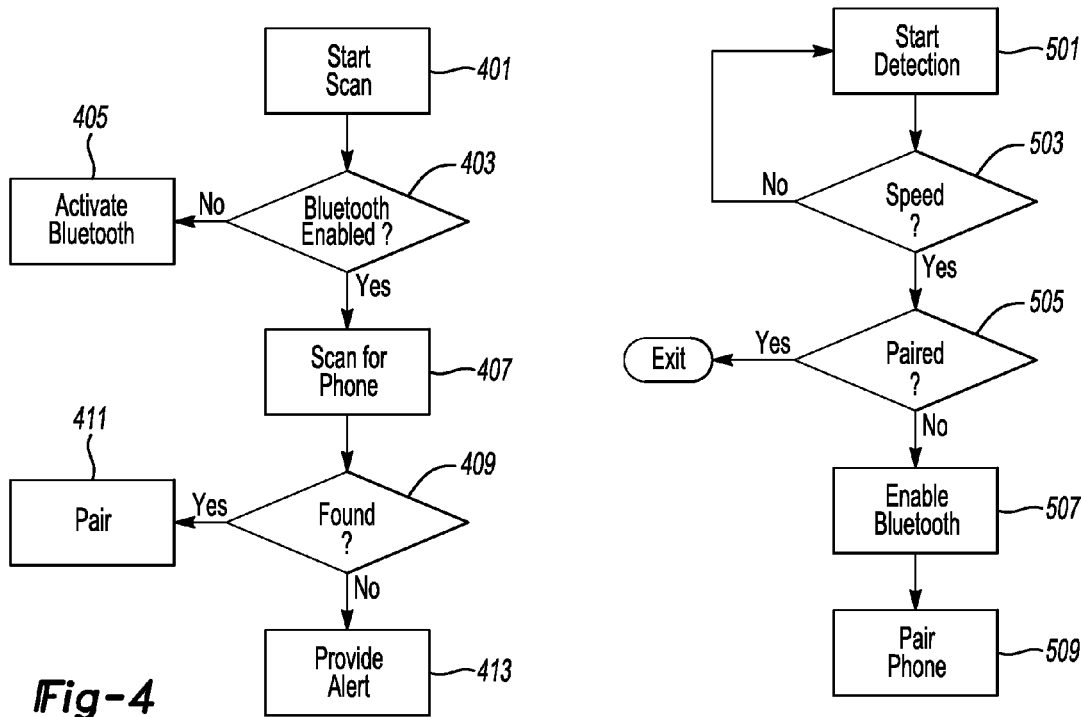
Fig-4
Fig-5

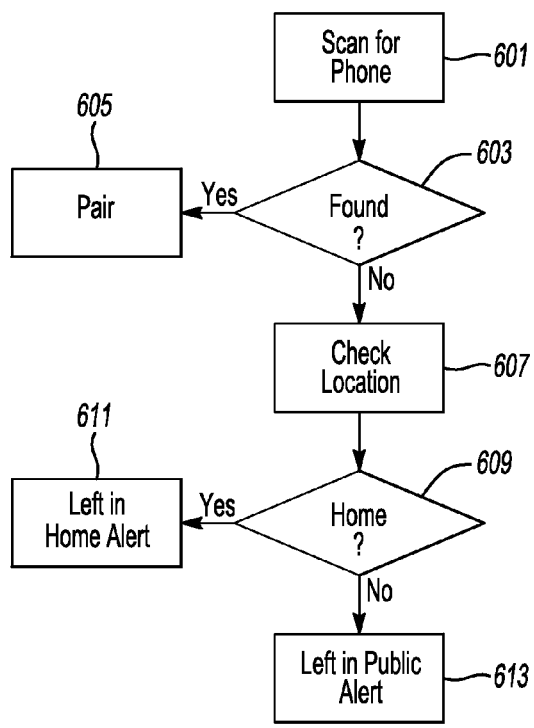
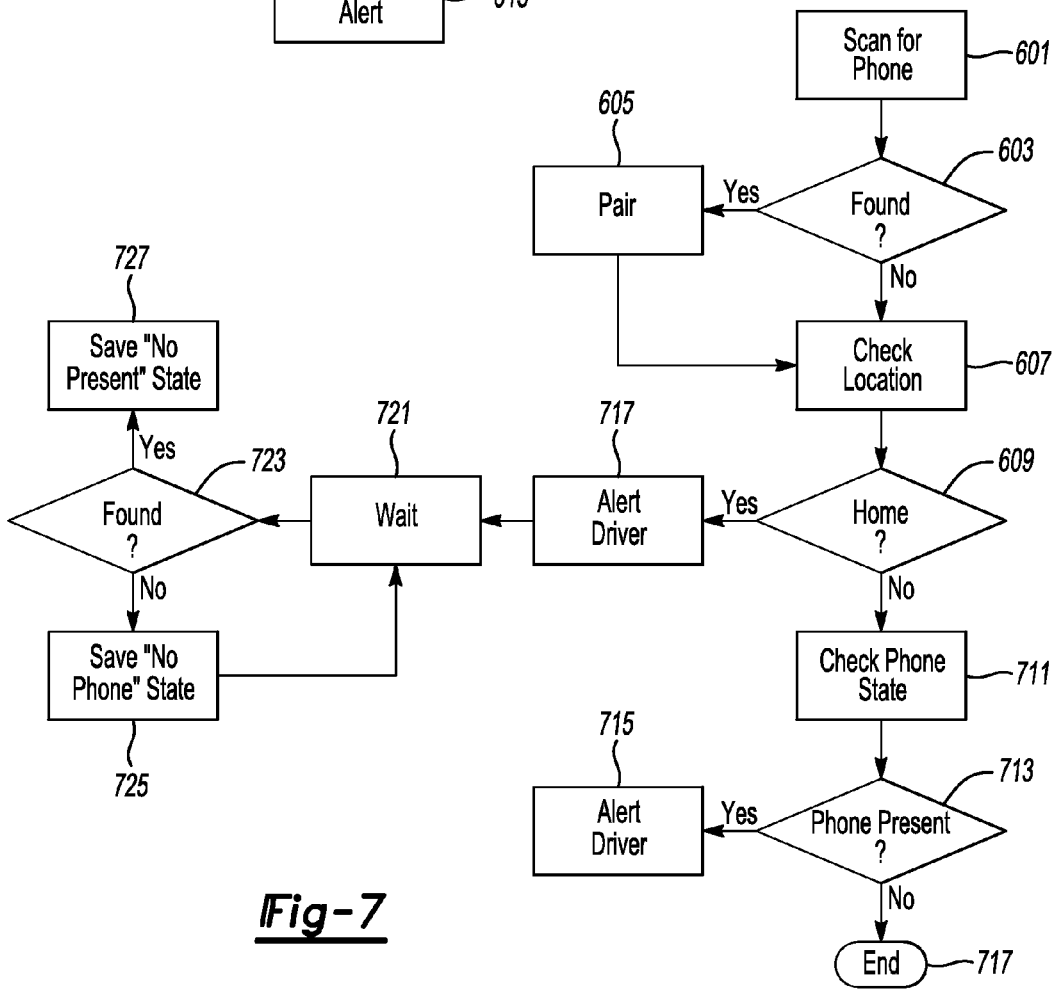

METHOD AND APPARATUS FOR DETECTING A LEFT-BEHIND PHONE

TECHNICAL FIELD

The illustrative embodiments generally relate to a method and apparatus for detecting a left-behind phone.

BACKGROUND

Mobile devices have created an environment in which people constantly and easily carry tablet PCs, smart phones and other Internet/communication devices everywhere they go. While this is certainly an enjoyable luxury, it also creates almost an innate need to have these devices with the owner at all times. Due to the virtually unlimited nature of on-demand communication, people have come to expect instant access and response to emails, text messages and phone calls. Because of the nature of modern technology, people can become easily annoyed and frustrated if commonly used devices are left behind, such as at home or at work.

Further, these devices are not cheap, and many of them can easily be forgotten in a public place. People may not remember where they have left the devices, and, due to the value of the devices, they are highly sought after targets for thieves if left unattended in a public place.

Numerous inventions have dealt with the concept of leaving things, and even people (such as infants) inside a vehicle.

For example, U.S. Patent application 2009/0079557 generally relates to a wireless, self-activating, proximity warning system that utilizes an on-board computer of an automobile and a GPS locating system to send a warning signal to a vehicle operator that a child has been left buckled and unattended in an infant seat. A transmitter associated with the child seat transmits coded RF signals of certain strength to a receiver carried by the operator. The receiver triggers an alarm when the signal strength or time between transmitted signals indicates that the operator has gone beyond a permitted range.

U.S. Patent application 2009/0146813 generally relates to a system for installation onto automobiles that will detect forgotten or abandoned passengers and notify the driver by email, cell phone, car alarm, or other means and will allow relief or rescue of trapped passengers.

Also, U.S. Pat. No. 5,600,302 generally relates to an electronic system for preventing keys from being locked inside a vehicle. An ignition or door key houses a wireless transmitter which can send a signal to lock or unlock the vehicle doors. As a driver approaches a locked car, the unlock button on the transmitter is pressed, thereby unlocking the doors. Upon exiting the vehicle, a driver may inadvertently lock himself out of the vehicle if the doors are manually locked when the door key is inadvertently left somewhere inside the car. To prevent lock-out, an oscillating unlock signal is automatically output to the electronic door locks. Simultaneously an alarm sounds to alert the driver that the keys are still in the car. The driver returns to the vehicle, opens the doors which have been automatically unlocked, and retrieves the keys. Upon retrieval of the keys, the driver again exits the vehicle, locks the doors manually or electronically, and presses the lock button to stop the alarm and end the transmission of the oscillating unlock signal.

SUMMARY

In a first illustrative embodiment, a system includes a vehicle computing processor. The processor is configured to, through wireless communication with a phone, and after determining that a vehicle engine is not running, request and receive motion sensor data from the phone. The processor is further configured to determine if a phone is moving with a driver based on the motion sensor data. Also, the processor is configured to alert the driver if the phone is not moving with the driver.

In a second illustrative embodiment, a computer implemented method includes determining, via a vehicle computing system (VCS), that a vehicle engine is not running. The method also includes wirelessly requesting and receiving motion sensor data from a phone to the VCS, subsequent to the determining that the vehicle engine is not running. Further, the method includes determining, at the VCS, if a phone is moving with a driver based on the motion sensor data. And, the method includes alerting the driver if the phone is not moving with the driver.

In a third illustrative embodiment, a tangible computer readable storage medium stores instructions that, when executed by a processor of a vehicle computing system, causes the processor to perform a method including determining, via a vehicle computing system (VCS), that a vehicle engine is not running. The method also includes wirelessly requesting and receiving motion sensor data from a phone to the VCS, subsequent to the determining that the vehicle engine is not running. Further, the method includes determining, at the VCS, if a phone is moving with a driver based on the motion sensor data. And, the method includes alerting the driver if the phone is not moving with the driver.

BRIEF DESCRIPTION OF THE DRAWINGS

FIG. 3 shows an illustrative process for determining if a phone is in motion;

FIG. 4 shows an illustrative process for automatically pairing a Bluetooth phone;

FIG. 5 shows another illustrative process for automatically pairing a Bluetooth phone;

FIG. 6 shows an illustrative process for detecting that a phone has been left behind; and FIG. 7 shows another illustrative process for detecting that a phone has been left behind.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
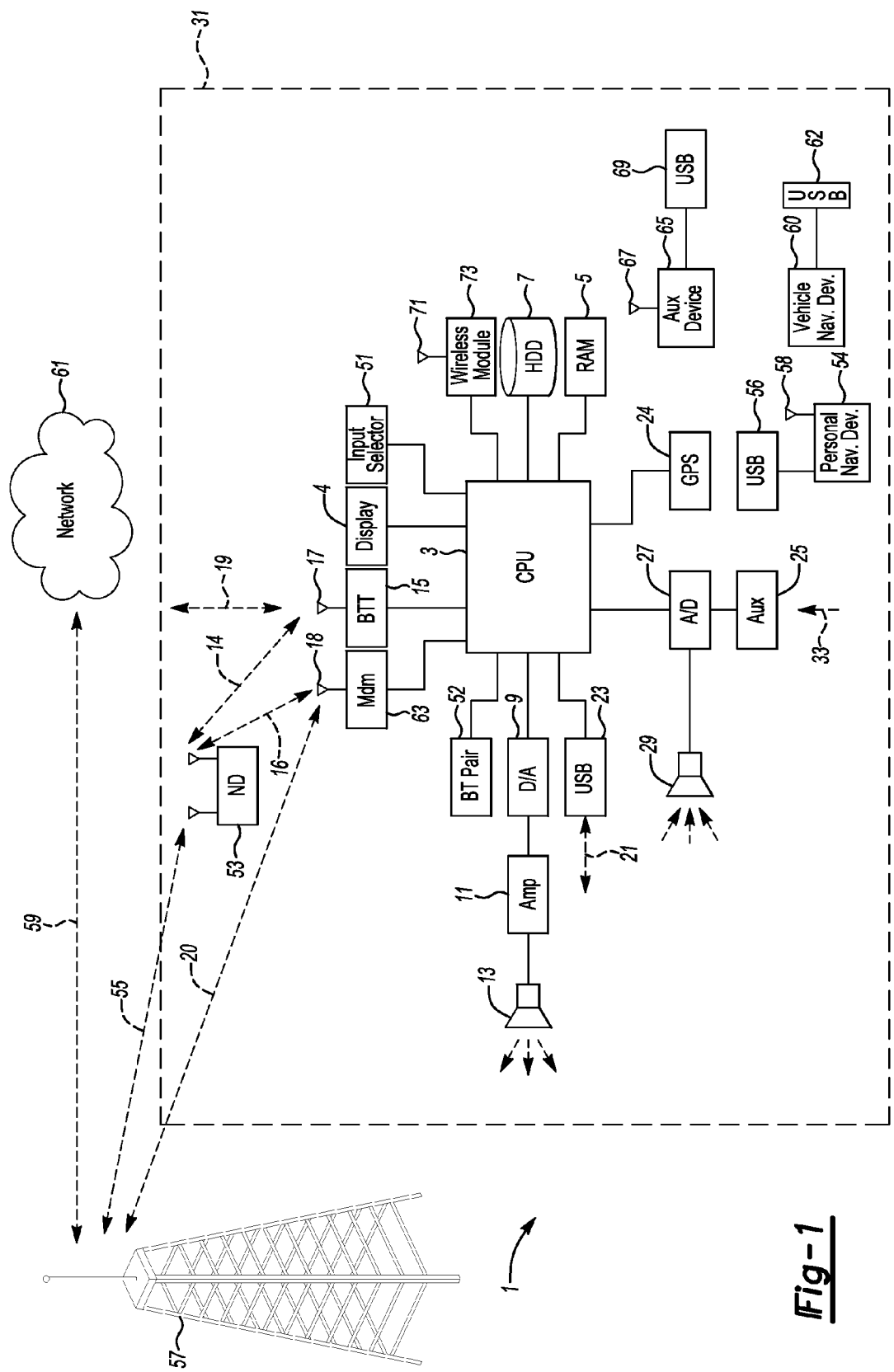
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
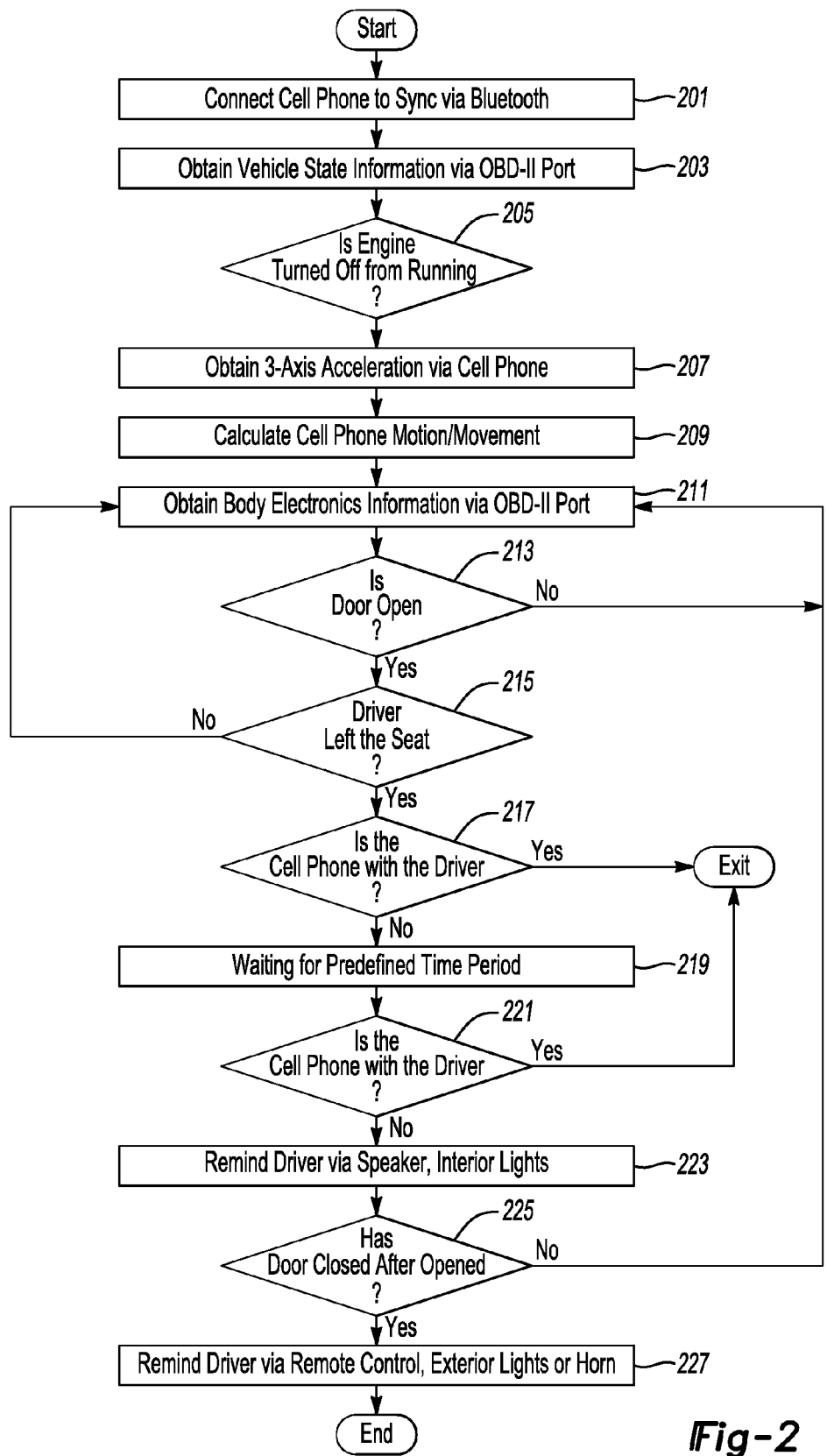
FIG. 2 shows an illustrative process for determining if a cell phone is left in a vehicle.

FIG. 2 shows an illustrative process for determining if a cell phone is left in a vehicle. In this illustrative example, the process has already detected the presence of at least one Bluetooth (BT) enabled device, such as a smartphone. Presumably, this device has already previously been set up for pairing with the system as well, although such setup could be performed if needed. First, in this illustrative example, the process connects a vehicle computing system (VCS) to a wireless BT enabled phone 201. The process then obtains information relating to a "running" state of the engine 203, and continues to monitor the engine until the engine is in a not-running state 205. Additionally or alternatively, the process could also monitor for driver presence, triggering a determination if the driver attempts to leave the vehicle, whether or not the engine is still running.

Next, in this illustrative example, the process obtains 3-axis acceleration for the phone. In this illustrative example, the phone's built in motion detector is utilized to determine if the phone is in motion (i.e., in the possession of the driver).

Motion of a phone (or other similarly equipped device) can be estimated, for example, by utilizing the magnitude of phone acceleration changes and/or tilt angle changes during a short-time duration after engine turned off. Other suitable means of determining phone motion can also be utilized, involving other applications of a phone's motion detector(s), utilization of short range transmitters (e.g., RFID), or any other means of determining a phone has left the proximity of a vehicle. Even BT itself has a limited range, and it can be determined that a BT connection has not been broken after a suitable delay following a driver exiting the vehicle (if, for example, some amount of power is reservedly applied to the in-vehicle BT transceiver following engine/electronics shutdown).

In this illustrative example, for a mobile phone device equipped with a three axis accelerometers, by measuring the X,Y and Z accelerations ($a_x$, $a_y$ and $a_z$) and by calculating a variable m defined as $m = a_x^2 + a_y^2 + a_z^2$, it can be observed that for a phone in a stationary state values close to 1 will result for the m as shown in the following table for illustrative purposes only.

| m | $a_x$ | $a_y$ | $a_z$ |
|---|---|---|---|
| 1.005 | 0.77 | 0.05 | 0.64 |
| 0.9797 | 0.52 | 0.62 | 0.57 |
| 1.0232 | 0.94 | 0.1 | 0.36 |
| 1.0395 | 0.01 | 0.95 | 0.37 |
| 0.9765 | 0.68 | 0.55 | 0.46 |
| 1.0265 | 0.52 | 0.75 | 0.44 |

If the phone with the accelerometers moves, m can be observed to shift away from the value of 1 as shown in the first row of the below table to a larger value of m as shown the second row of the below table:

| m | $a_x$ | $a_y$ | $a_z$ |
|---|---|---|---|
| 1 | 0 | 1 | 0 |
| 1.44 | 0 | 1.2 | 0 |

Additionally or alternatively, tilt angle changes can be used to determine that a phone has left the vehicle, using, for example, the equations below:

$$\theta_x = \arctan\left[\frac{a_x}{\sqrt{a_y^2 + a_z^2}}\right]$$

$$\theta_y = \arctan\left[\frac{a_y}{\sqrt{a_x^2 + a_z^2}}\right]$$

$$\theta_z = \arctan\left[\frac{\sqrt{a_x^2 + a_y^2}}{a_z}\right]$$

Where, $\theta_x$, $\theta_y$ and $\theta_z$, represent tilt angle changes about X, Y and Z axis of the mobile device with the three axis accelerometers. Utilizing equations related to phone tilt angle changes, such as the ones presented above, the process may calculate a current state of phone movement 209. A threshold based on the three tilt angle changes can be used to assess whether the mobile device is in a stationary condition. This can be used to determine the state of the phone, and/or as a basis for comparison.

Next, the process may determine a current vehicle state 211 (e.g., without limitation, motion, engine-on/off, occupant presence, etc.). Utilizing the obtained information, the process can determine, for example, whether or not a vehicle door is open/has been opened 213. If the door is opened, the process may also determine whether or not the driver has left a vehicle seat 215. This can be an indicia that the driver has left the vehicle.

In this example, if the door has been opened and the driver has left the vehicle seat, the process may then utilize the phone motion information to determine if the phone is currently moving (i.e., with the driver) 217. If the phone is with the driver, the process may exit, its purpose satisfied. If the phone is not with the driver, it may be the case that the driver is reaching back inside the vehicle for the phone, and, accordingly, the process may wait for some time period before proceeding 219.

After the time period passes, in this example, the process determines whether the phone is with the driver. If the phone is not with the driver, the process may remind the driver through, for example, a vehicle speaker or a visual queue such as lights 221. Additionally, the process may determine whether or not the vehicle door has closed (signaling that the driver may not be able to hear/see the in-vehicle warning)

223. If the door has closed, the process may utilize an exterior reminder, such as vehicle lights or horn to remind the driver 227. In another illustrative alternative, the processor could use a reminder device built into a key-fob to remind the driver.

FIG. 3 shows an illustrative process for determining if a phone is in motion. In this illustrative example, once again, the phone's motion detector can be utilized to determine the movement of the phone. Some level of phone acceleration can be detected 301 and/or a current tilt of a phone can be determined 303.

Utilizing this information, the process can check for a significant level of tilt change 305 and/or acceleration change 307. If either and/or both changes are detected (perhaps in utilization with vehicle information), the process can determine that a phone is in motion.

FIG. 4 shows an illustrative process for automatically pairing a Bluetooth phone. In this illustrative example, the process first scans/detects 401 whether or not a BT transceiver is enabled in a vehicle computing system 403. If the BT transceiver in not currently enabled, the process proceeds to enable the BT transceiver 405.

Once an enabled BT transceiver is found, the process then scans for a phone that has been previously enabled for pairing with the system. This process can detect, for example, a primary phone or, in another instance, one or more secondary phones 407.

If a compatible phone is found 409, the process may proceed to automatically pair the phone 411. Alternatively, the process may suggest to a driver that the phone be paired in order to facilitate hands-free usage. If a phone is not found (indicating, for example, that a phone may have been left behind or is simply not powered), the process may provide an alert to a driver 413.

FIG. 5 shows another illustrative process for automatically pairing a Bluetooth phone. In this example, the process again attempts to determine if BT capability is enabled 501. In this example, the process will wait until the vehicle has reached a certain speed indicating that the vehicle has likely left a location and is traveling. In at least one instance, any amount of speed may be sufficient as indicia of a vehicle leaving a location. If the vehicle has reached a certain speed 503, the process checks to see if a phone has yet been paired 505.

If the vehicle is at speed, and a phone has not yet been paired, the process may enable a BT transceiver (if not already enabled) 507 and then proceed to pair a phone 509. Again, if necessary, the process may first check to see if one or more phones which may be paired are present in the vehicle.

FIG. 6 shows an illustrative process for detecting that a phone has been left behind. In this illustrative example, the process scans for a local BT signal indicating that a BT phone is present 601. If the phone is present, the process may proceed to automatically pair the VCS and the BT phone 605, or, in another alternative, the process may alert the driver that the phone is present and available for pairing.

If there is no phone present, the process may check a current location of the vehicle 607. Since the vehicle may include a GPS device, it may be possible to know the current location of the vehicle. Further, it may be possible to know, based on stored data, what a user's home location is, office location is, etc. If the phone was left at home (or another common location), the process may proceed with one alert type 611, notifying the user, for example, that the phone may have been left in the home/office/etc. based on the location.

In this example, a second alert is provided if the vehicle is at an unknown location (i.e., not previously saved). In this instance, it is a possibility that the user left a phone in a public place, and that immediate retrieval may be desired. This alert can be higher priority 613, in one example, and may include such features as louder sound and/or more vivid displays. In another embodiment a single alert can be used for all phone-left-behind situations.

FIG. 7 shows another illustrative process for detecting that a phone has been left behind. In this illustrative example, the process "learns" whether a phone left the house with a user in the morning. So, in one example, the process, after pairing the phone 605, then proceeds to a location check 607.

If the user is at home, then the user must be headed out. In this example, the process is run when the vehicle is turned on, and each time the process is executed at a user's house, the current phone state can be reset. So, in this example, if the user is at home 609, the process may first alert a driver (if a phone is not present) 719, so that the driver can turn on or go get a phone if desired.

After waiting some period of time 721 (or, for example, waiting until a phone signal is found), the process can, in this instance, check for a BT compatible phone (or other phone) 723. If there is no phone found, the process will save a "no phone" state. This setting can continue as long as the vehicle is powered, each interval of wait time. In this manner, if the user turns on a phone at any point during an initial leg of a journey, the process will register the phone as being present.

If the phone is found, the process can then save a "phone present" state 727. The process can then exit, having registered that a phone was present on an initial leg of a journey originating from home.

When the vehicle is powered at any other location, along this journey, the process can be run again. Since the location is not home 609, the process can then check a current saved phone state 711. This state will correspond to a state set when the user left the house, and in general, indicate whether a user even began the journey with a phone. If the phone should be present, according to the state check 713, but the phone is not present, in reality, then the system can alert the driver that a phone may have been left behind 715. If there was never a phone present originally 713 (recognizable as, for example, a "not present" state), then the process can skip alerting the user 717, since there was not a record of the user beginning the journey with a phone. This can help avoid false alerts and make real alerts more meaningful.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a vehicle computing processor configured to:
   communicate wirelessly with a mobile phone;
   determine that a vehicle engine is not running;
   determine if a vehicle door has opened;
   request and receive three-axis acceleration data from the phone, if a vehicle door has opened;
   determine if a phone is moving with a driver based on an equation $m = a_x^2 + a_y^2 + a_z^2$, wherein m is close to 1 if the phone is not moving with the driver, after the driver leaves the vehicle, wherein $a_x$, $a_y$, and $a_z$, are phone three axis acceleration values, and where m deviating from 1 by more than a predetermined amount indicates that a phone is moving with the driver; and
   alert the driver if the phone is not moving with the driver.

2. The system of claim 1, wherein the processor is further configured to determine if the driver has left a vehicle prior to determining if the phone is moving with the driver.

3. The system of claim 1, wherein the processor is configured to activate at least one of horns or lights to alert the driver.

4. The system of claim 1, wherein the determination if the phone is moving is based on one or more observed brief periods of time after the vehicle engine has stopped running.

5. A computer implemented method comprising:
   determining that a vehicle engine is not running;
   determine if a vehicle door has opened;
   if the engine is not running and a vehicle door has opened, wirelessly requesting and receiving phone three-axis-acceleration data;
   determining, at a vehicle computing system, if a phone is moving with a driver based on an equation $m=a_x^2+a_y^2+a_z^2$, wherein m is close to 1 if the phone is not moving with the driver, after the driver leaves the vehicle, wherein $a_x$, $a_y$ and $a_z$, are phone three axis acceleration values, and where m deviating from 1 by more than a predetermined amount indicates that a phone is moving with the driver; and
   alerting the driver if the phone is not moving with the driver.

6. The method of claim 5, wherein the alerting includes activating at least one of horns or lights to alert the driver.

7. The method of claim 5, wherein the determination if the phone is moving is based on one or more observed brief periods of time after the vehicle engine has stopped running.

8. A non-transitory computer readable storage medium, storing instructions that, when executed by a processor of a vehicle computing system, cause the processor to perform the method comprising:
   determining, via a vehicle computing system (VCS), that a vehicle engine is not running;
   determine if a vehicle door has opened;
   subsequent to the determining that the engine is not running, and if a vehicle door has opened, wirelessly requesting and receiving three-axis-acceleration data from a phone to the VCS;
   determining, at the VCS, if a phone is moving with a driver based on an equation $m=a_x^2+a_y^2+a_z^2$, wherein m is close to 1 if the phone is not moving with the driver, after the driver leaves the vehicle, wherein $a_x$, $a_y$ and $a_z$, are phone three axis acceleration values, and where m deviating from 1 by more than a predetermined amount indicates that a phone is moving with the driver; and
   alerting the driver if the phone is not moving with the driver.

9. The computer readable medium of claim 8, wherein the processor is configured to activate at least one of horns or lights to alert the driver.

10. The computer readable medium of claim 8, wherein the determination if the phone is moving is based on one or more observed brief periods of time after the vehicle engine has stopped running.

* * * * *